United States Patent [19]

Tanaka

[11] Patent Number: 5,038,330
[45] Date of Patent: Aug. 6, 1991

[54] BIAS MAGNETIC FIELD IMPRESS APPARATUS FOR OPTO-MAGNETIC DISK APPARATUS INCLUDING PERMANENT MAGNET

[75] Inventor: Masashi Tanaka, Musashino, Japan
[73] Assignee: Teac Corporation, Tokyo, Japan
[21] Appl. No.: 477,295
[22] Filed: Feb. 8, 1990
[30] Foreign Application Priority Data
  Feb. 13, 1989 [JP] Japan ................ 1-15524[U]
[51] Int. Cl.[5] ................ G11B 13/04; G11B 11/12
[52] U.S. Cl. ................ 369/13; 360/114; 360/59
[58] Field of Search ............ 369/13; 360/59, 114; 365/122; 235/449

[56] References Cited

U.S. PATENT DOCUMENTS

| | | | |
|---|---|---|---|
| 4,701,895 | 10/1987 | VanSant | 365/122 |
| 4,742,213 | 5/1988 | Conant | 235/449 |
| 4,748,606 | 5/1988 | Naito et al. | 365/122 |
| 4,789,972 | 12/1988 | Oldham | 369/13 |

FOREIGN PATENT DOCUMENTS 0290281 11/1988 European Pat. Off. ........ 369/13

Primary Examiner—Stuart S. Levy
Assistant Examiner—Hoa Nguyen
Attorney, Agent, or Firm—Michael N. Meller

[57] ABSTRACT

A bias magnetic field apparatus for opto-magnetic disk apparatus includes a permanent magnet provided so as to closely oppose a side of an opto-magnetic disk opposite the side opposed by the optical head, the permanent magnet rotataably movable around an axis of rotation and having different magnetic poles at each end with respect to the axis of rotation, and one of the magnetic poles opposing the opto-magnetic disk to impress a bias magnetic field to the opto-magnetic disk, a stepping motor to rotate the permanent magnet, defect means for detecting a rotational position of the permanent magnet, where one of the poles of the permanent magnet substantially opposes the disk, and control means for driving the stepping motor so that the permanent magnet is stopped at a rotational position where one of said poles of the permanent magnet opposing the opto-magnetic disk and at the same time so that the permanent magnet is rotated 90° in accordance with the end of the erase mode and recording mode from a position where the permanent magnet had been stopped.

6 Claims, 5 Drawing Sheets

FIG. IA
PRIOR ART
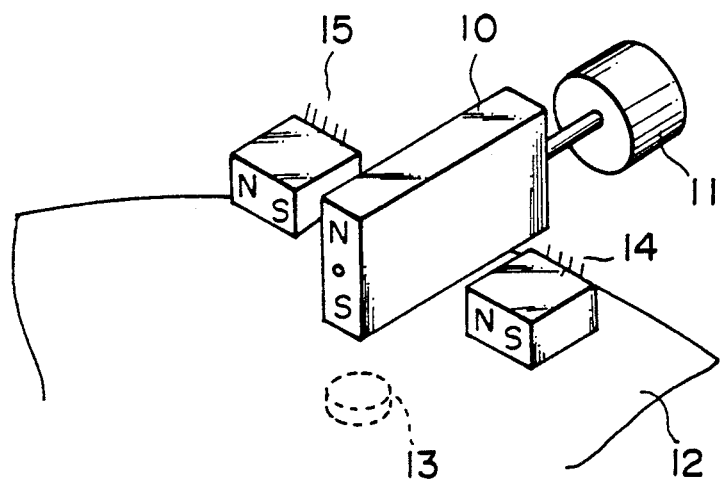
FIG. IB
PRIOR ART
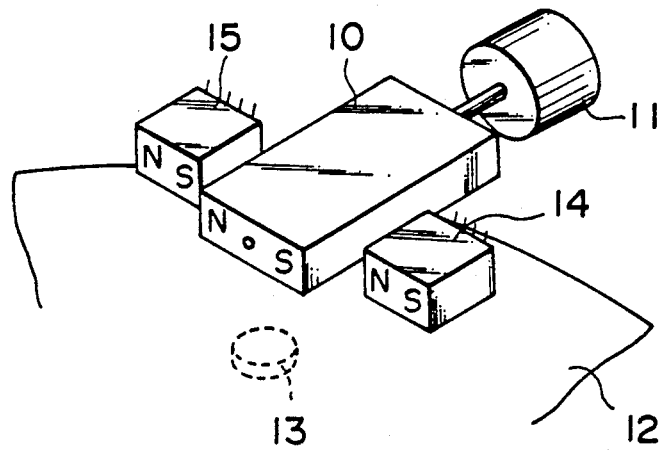

BIAS MAGNETIC FIELD IMPRESS APPARATUS FOR OPTO-MAGNETIC DISK APPARATUS INCLUDING PERMANENT MAGNET

BACKGROUND OF THE INVENTION

The present invention relates to a bias magnetic field impress apparatus using a permanent magnet for an opto-magnetic disk apparatus.

Optical disk apparatus records information by magnetizing a magnetic layer of an opto-magnetic disk, in the vertical direction. When in the recording or the erase modes, a bias magnetic field impress apparatus becomes necessary to impress a bias magnetic field in the vertical direction with respect to the portion of the disk to which a laser beam is to be irradiated.

Permanent magnets have been used as a bias magnetic field impress apparatus.

Bias magnetic field impress apparatus using these permanent magnets have a permanent magnet which rotates so as to correspond to mode changes in the opto-magnetic disk apparatus. When in the recording or the erase mode, the permanent magnet is stopped at a position where the magnetic field has to operate in the vertical direction with respect to that portion of the disk to which the laser beam is to be irradiated, and when in the playback mode, the permanent magnet is stopped at a position where the magnetic field does not act in the vertical direction with respect to portion of the disk to which the laser beam is to be irradiated.

(1) It is desirable that these bias magnetic field impress apparatus be able to impress a favorable bias magnetic field when there is the recording mode and the erase mode, and without the generation of any unnecessary field, and (2) it is desirable that the configuration be as compact as possible and with as few parts as possible.

In conventional bias magnetic field impress apparatus, two permanent magnets are disposed at both sides of a rectangular prism-shaped permanent magnet for impressing the bias magnetic field, which two permanent magnetic are used to hold the permanent magnet described above at a position parallel to the disk.

The magnetic field of these permanent magnets used for holding the permanent magnet tended to influence the bias magnetic field impressed to the opto-magnetic disk by the permanent magnet described above, for impressing the bias magnetic field.

In addition, the provision of permanent magnets for holding increased the number of parts in the bias magnetic field impress apparatus and made it difficult to make them more compact.

FIG. 1A indicates the state for the recording or the erase mode of a conventional bias magnetic field impress apparatus. FIG. 1B indicates the state for the playback mode.

In the figures, a permanent magnet 10 is for impressing a bias magnetic field, and is of a shape of rectangular prism, with magnetic poles on both sides in the direction of the width. This permanent magnet 10 is fixed on a rotating shaft of a stepping motor 11 and is disposed so that it confronts a disk 12 at a surface opposite to the other surface opposing an objective 13, and extends in the direction of the radius of the disk 12.

In addition, on both sides of the permanent magnet 10 are provided permanent magnets 14 and 15 to hold the permanent magnet 10 in a position where it is parallel to the disk 12.

When in the erase and the record modes, the permanent magnet 10 is rotated by the stepping motor 11, to a position where it is vertical with respect to the disk 12, as indicated in FIG. 1A, and is held in that position by the stepping motor 11, and the magnetic field is impressed in the vertical direction to the disk 12.

When there are modes other than the erase and the recording mode, the holding current to the stepping motor 11 is interrupted and the permanent magnet 10 is magnetically pulled back by the permanent magnets 14 and 15 to be held in the state indicated in FIG. 1B.

The permanent magnets 14 and 15 for holding, are provided in the vicinity of the permanent magnet 10 and the disk 12 and so the bias magnetic field impressed to the disk 12 by means of the permanent magnet 10 receives the influence, and this causes recording and erase to be adversely affected.

In addition, through the provision of the permanent magnets 14 and 15 for holding, the number of parts in the bias magnetic field impress apparatus increases and it is difficult to make the apparatus more compact.

SUMMARY OF THE INVENTION

Accordingly, it is a general object of the present invention to provide a novel and useful bias magnetic field impress apparatus for an opto-magnetic disk apparatus in which the problems described heretofore are eliminated.

Another and more specific object of the present invention is to provide a bias magnetic field impress apparatus for an opto-magnetic disk apparatus which has a configuration wherein is provided a means for detecting a rotational position of a permanent magnet where a magnetic pole of the permanent magnet opposes an opto-magnetic disk, so that a stepping motor is rotated by a predetermined angle of rotation corresponding to set mode signals of an opto-magnetic disk apparatus and output signals of said detect means, so that a permanent magnet is rotated to a position corresponding to the above described set mode.

According to the present invention, it is not necessary to provide, around the permanent magnet, the permanent magnets for determining a position of rotation stop of the permanent magnet and holding the permanent magnet at the above position.

By doing this, there is no adverse influence exerted upon the bias magnetic field impressed by the permanent magnet to the opto-magnetic disk and so a favorable bias magnetic field is impressed in the erase mode and the record mode and the erasing and recording characteristics of the opto-magnetic disk are improved.

In addition, there is a smaller number of parts when compared to conventional bias magnetic field apparatus and the bias magnetic field apparatus itself can also be made smaller.

BRIEF DESCRIPTION OF THE DRAWINGS

FIGS. 1A and 1B are views indicating a conventional opto-magnetic disk apparatus;

DESCRIPTION OF THE PREFERRED EMBODIMENTS

Figure 2:
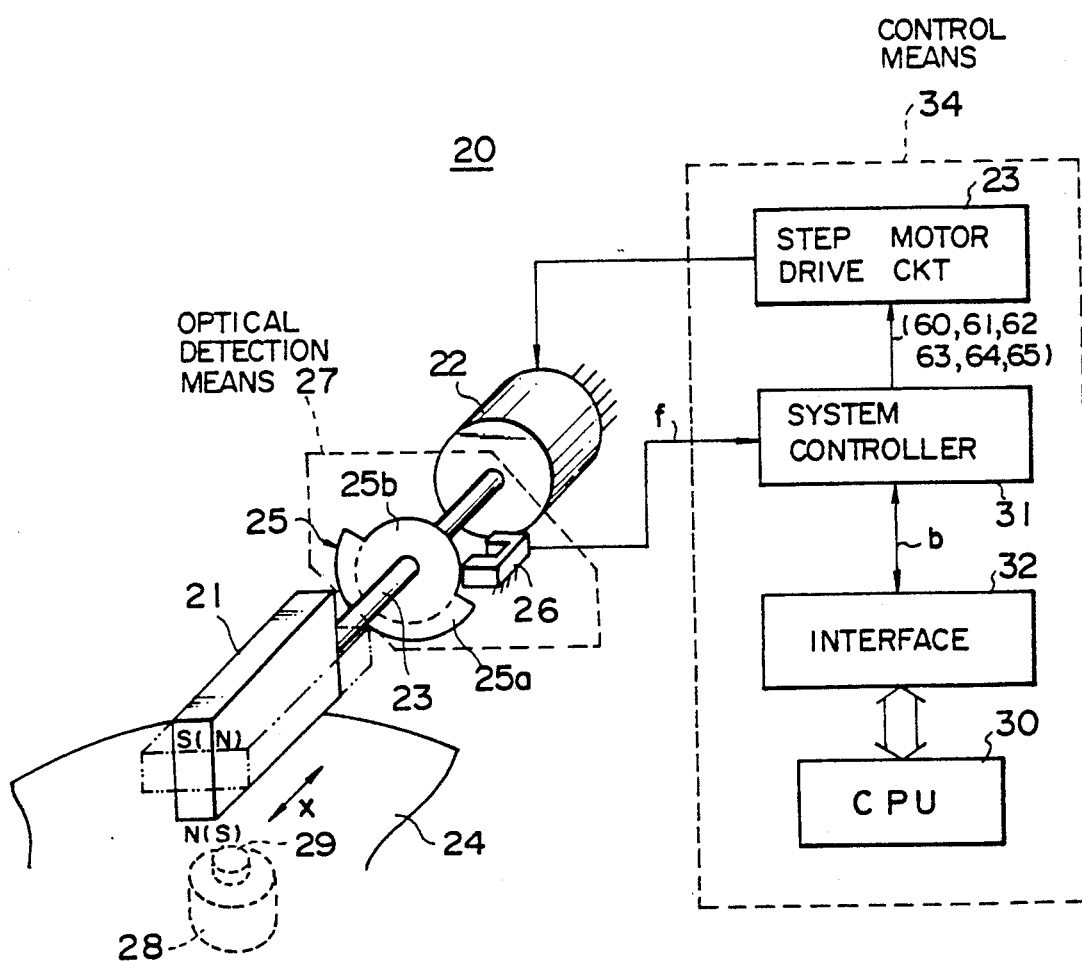
FIG. 2 is a view indicating the principle of the configuration of one embodiment of a bias magnetic field impress apparatus according to the present invention.

FIG. 2 indicates the principle of the configuration of a bias magnetic field apparatus 20 of an opto-magnetic disk apparatus, according to the present invention.

A permanent magnet 21 for impressing a bias magnetic field, is fixed on a spindle 23 of a stepping motor 22. Of the two sides of a disk 24, this permanent magnet 21 opposes the vicinity of the upper surface which is the surface on the side opposite the side that an objective 29 of an optical head 28 faces, and is provided so that it extends in the direction X of movement of the optical head 28.

The stepping motor 22 operates with one step per every one pulse and the specification is such that there is 18° rotation per step.

To the spindle 23 is fixed an interruptor disk 25 comprising a large-diameter interruptor portion 25a and a small-diameter non-interruptor portion 25b, so that there is a predetermined rotational position relationship with respect to the permanent magnet 21. The large-diameter interruptor portion 25a and the small-diameter non-interruptor portion 25b both cover half of the perimeter of the interruptor disk 25. The boundary between the large-diameter interruptor portion 25a and the small-diameter non-interruptor portion 25b is positioned along one of the diameters of the interruptor disk 25 and is symmetrical with respect to the center of the interruptor disk 25.

A photo-interruptor 26 is provided at a position opposing a predetermined position in the direction of the periphery of the interruptor disk 25.

The positional relationship between the permanent magnet 21, the interruptor disk 25 and the photo-interruptor 26 is such that, in the rotational position where one of the magnetic poles of the permanent magnet 21 is rotated 36° from the rotational position with respect to the disk 24, the borderline between the large-diameter interruptor portion 25a and the small-diameter non-interruptor portion 25b of the interruptor disk 25 is detected by the photo-interruptor 26.

Figure 6:
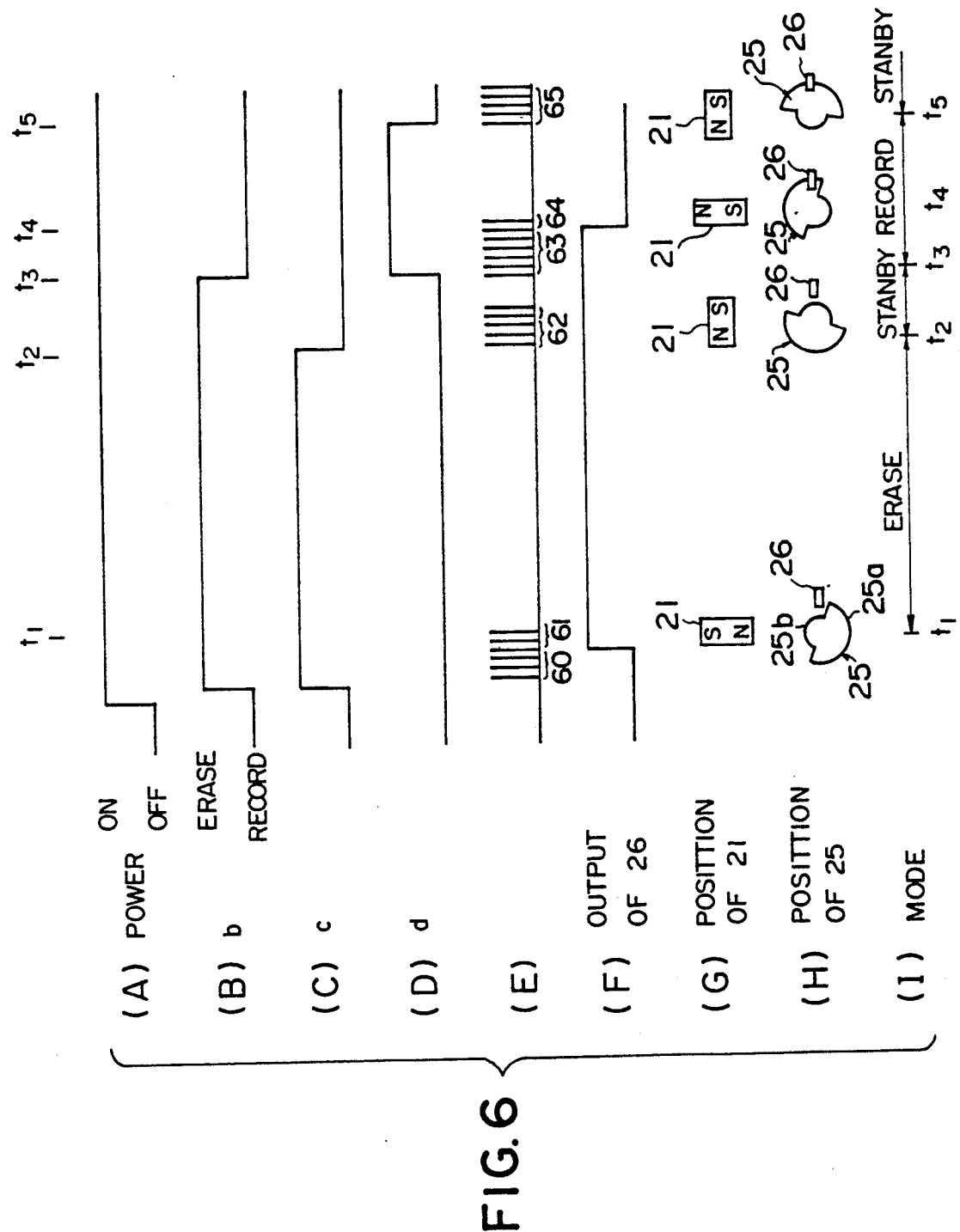
FIG. 6 is a diagram indicating the operation of the apparatus of FIG. 2.

The light to the photo-interruptor 26 is not interrupted by the small-diameter non-interruptor portion 25b of the interruptor disk 25 and outputs a high ("H") level signal as indicated by the symbol f in FIG. 6(F), but the light to the photo-interruptor 26 is interrupted by the large-diameter interruptor portion 25a of the interruptor disk 25 and a low ("L") level signal is output.

The interruptor disk 25 and the photo-interruptor 26 comprise an optical detection means 27.

A CPU 30 controls the entire operation of the opto-magnetic disk apparatus.

A system controller 31 is connected to the CPU 30 via an interface 32 and is also connected to the photo-interruptor 26. In addition, the system controller 31 is also connected to a stepping motor drive circuit 32 that drives the stepping motor 22.

As will be described later, the system controller 31 outputs pulse signals (refer to FIG. 6(E)) to the motor drive circuit 32, corresponding to the signal f 20 (refer to FIG. 6(F)) from the photo-interruptor 26 and the erase/record request signal b (refer to FIG. 6(B)) that requests either the record side or the erase side for the bias magnetic field, which signal b is generated from the CPU 30 via the interface 32. In addition, the system controller 31 generates record signals d (refer to FIG. 6(D)) indicating that the opto-magnetic disk apparatus is performing record operation, or erase signals c (refer to FIG. 6(C)) indicating that the opto-magnetic disk apparatus is performing erase operation. These signals are signals internal to the system controller 31 and are not output externally.

The CPU 30, the system controller 31, the interface 22 and the stepping motor drive circuit 32 comprise a control means 34.

Figure 3:
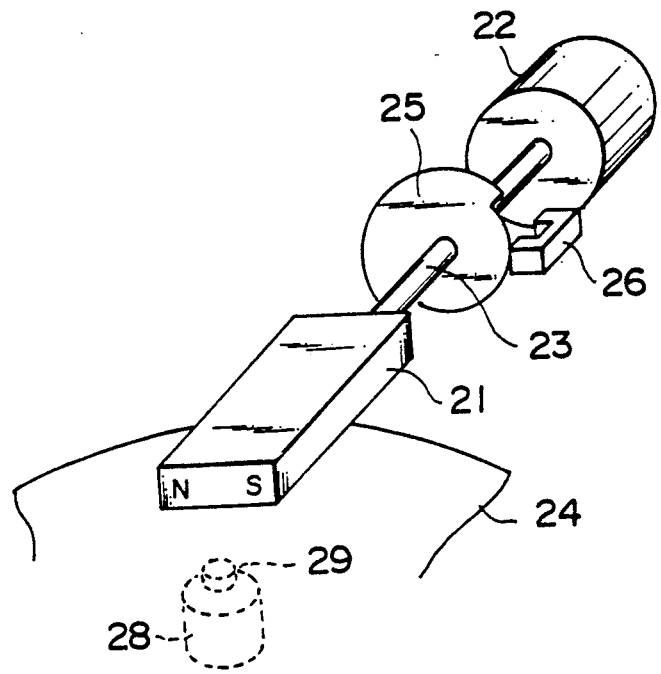
FIG. 3 is a view indicating the state when the permanent magnet of FIG. 2 is parallel to the disk.

The control means 34 drives the stepping motor 22 so that the permanent magnet 21 is parallel with respect to the disk 24 as indicated in FIG. 3, corresponding to the end of erase or record operation, and at the same time makes the permanent magnet 21 vertical with respect to the disk 24 as indicated in FIG. 2, in accordance with the erase/record request signals.

The following description will deal with the configuration of permanent magnet 21., the stepping motor 22 and the portions relating to these.

Figure 4:
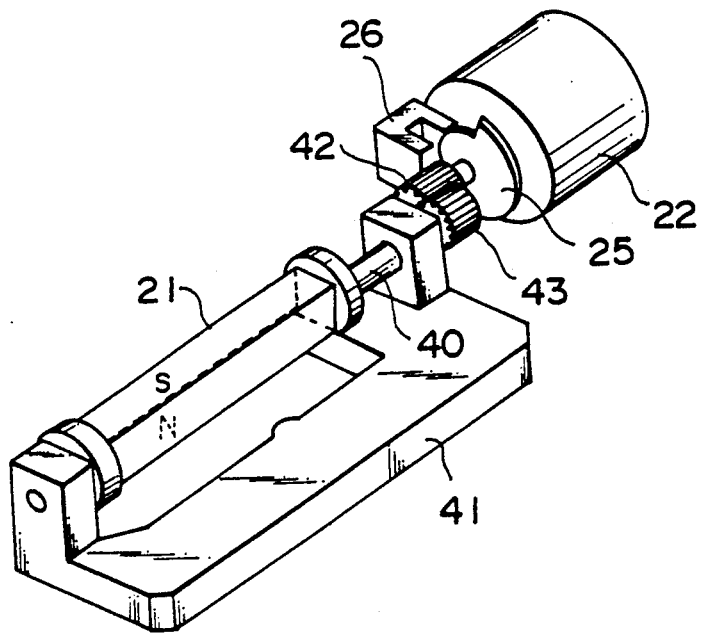
FIG. 4 is a view indicating a specific configuration of a portion for holding the permanent magnet of FIG. 2 and a portion for rotating it.

As is indicated in FIG. 4, the permanent magnet 21 is axially mounted on a bracket on a support frame 41 supporting a shaft 40 at both of its ends. The motor 23 and the shaft 40 are linked by gear wheels 42 and 43 having the same number of teeth. The interruptor disk 25 is fixed to the spindle of the motor 22.

Figure 5:
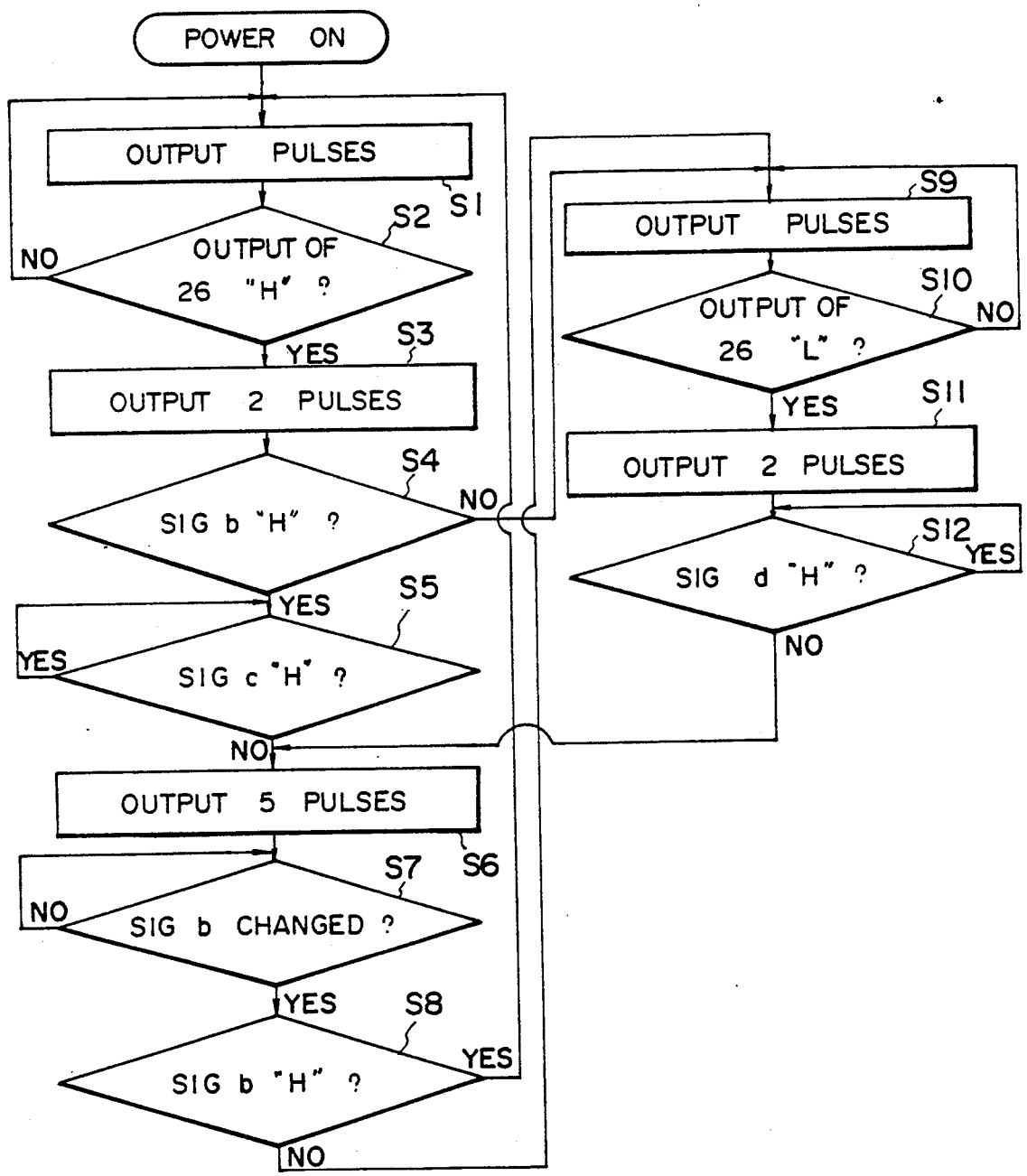
FIG. 5 is a flow chart for describing the operation of the system controller in FIG. 2.

The following will be a description concerning the processing that is executed by the system controller 31 to operate the bias magnetic field apparatus 20 described above, with reference to FIG. 5 and 6.

When the power to the opto-magnetic disk apparatus is turned on and the signal a indicated in FIG. 6(A) is input, stepping pulses as indicated by 60 in FIG. 6(E) are output (step S1).

The motor 22 then starts. This is because when the power is applied, it is uncertain as to which rotational position the permanent magnet 21 is in and so it is necessary to set the permanent magnet 21 to a reference position.

Then, in step S2, it is determined whether the output signal of the photo-interruptor 26 is "H" or not.

If the result of this determination is YES, then two pulse signals are output in step S3 as indicated by 61 in FIG. 6(E).

By this, the motor 22 rotates two steps (corresponding to 36 degrees of rotation) after the YES result, and then stops and the permanent magnet 21 is in a position where it is vertical with respect to the disk 24, as shown in FIG. 2, and the N-pole is in the state whereby it opposes the disk 24 (refer to FIG. 6(G) and FIG. 6(H)).

Not stopping the motor 22 at the position where the output of this photo-interruptor 26 changes from "L" to "H", but stopping the motor 22 after it has moved further two steps is to make the portion away from the borderline between the large-diameter interruptor disk 25a and the small-diameter non-interruptor portion 25b of the interruptor disk 25 to oppose the photo-interruptor 26, so that the output of the photo-interruptor 26 does not cause chattering even if vibration of the like is applied the motor 22.

Then, in step S4, it is determined whether the erase/record request signal is the "H" level (erase) at the time $t_1$, as indicated in FIG. 6(B).

In the present embodiment, the result of this determination is YES so that operation mode of the opto-magnetic disk apparatus becomes the erase mode (refer to FIG. 6(I)) and the laser beam is focussed by the optical head 28 and erase starts.

In the following step S5, as indicated in FIG. 6(C), determination is performed for whether the erase signal is "H" (erase being performed) or not and monitoring is performed for when the erase signal changes from "H" to "L".

When the erase signal changes from "H" to "L" at the time $t_2$ and the result of the determination in step S5 is NO, then in step S6, five pulse signals (indicated by 62 in FIG. 6(E)) are output so that the permanent magnet 21 rotates 90°.

By this, the motor 22 is driven and the permanent magnet 21 is rotated 90° to come to the position indicated by the chain double-dashed line in FIG. 2, and made parallel to the disk 24 as indicated in FIG. 3, the magnetic flux density acting perpendicularly to the disk 24 is reduced and the opto-magnetic disk apparatus changes from the erase mode to the standby mode (refer to FIG. 6(G), FIG. 6(H), FIG. 6(I)).

Following this in step S7, there is the confirmation of the change of the erase/record request signal.

When the erase/record request signal changes at the time $t_3$ and the determination result of step S7 changes to YES, then in the following step S8, the determination is made for whether the erasel-record request signal has changed to "H" (erase) or not.

In the present embodiment, the result of this determination is NO. In this case, a pulse is output in step S9 (as indicated by 63 in FIG. 6(E)). By this, the motor 22 is restarted and the permanent magnet 21 is rotated.

Then, in step S10, monitoring is performed for when the output signal of the photo-interruptor 26 changes from "H" to "L".

When the signal becomes "L" at the time $t_4$ and the determination results of step S10 becomes YES, then in step S11, two pulse signals are output (as indicated by 64 in FIG. 6(E)). Accordingly, in the same manner as for the case of the previously described reference position, chattering in the output of the photo-interruptor 26 is prevented from occurring.

By this, the permanent magnet 21 is in the perpendicular position with respect to the disk 24 and as indicated in FIG. 2, and now enters the state where the S-pole opposes the disk 24 (refer to FIG. 6(G)).

Then in the following step 12, determination is performed for whether the record signal of FIG. 6(D), is "H" (recording operation being performed) or not.

Then, the operation of step S12 is repeated for as long as the result of this determination is YES.

When the record signal becomes "L" at the time $t_5$ in FIG. 6(D), and the result of the determination in step S12 is NO, and the operation of step S6 is performed.

This is to say that as indicated by 65 in FIG. 6(E), five pulse signals are output so that the permanent magnet 21 is rotated 90°. By this, the permanent magnet 21 is placed in the direction parallel to the disk 24, as indicated in FIG. 3, and the mode enters the standby mode once again.

Moreover, the pulse interval indicated in FIG. 6(E) is wide but this is for the sake of convenience of diagrammatic explanation. In actuality, the pulse interval is narrow and the rotation of the permanent magnet 21 is performed instantaneously.

Further, the present invention is not limited to these embodiments, but various variations and modifications may be made without departing from the scope of the present invention.

What is claimed is:

1. A bias magnetic field impress apparatus including a permanent magnet for an opto-magnetic disk apparatus comprising;

said permanent magnet disposed along the same direction as the direction of movement of an optical head along a radial direction of an opto-magnetic disk, and provided so as to closely oppose a side of said opto-magnetic disk opposite a side opposed by said optical head, said permanent magnet rotatably movable around an axis of rotation extending in the same direction as the direction of movement of said optical head and having different magnetic poles at both ends with respect to said axis of rotation, and one of said magnetic poles opposing said opto-magnetic disk to impress a bias magnetic field on said opto-magnetic disk;

a stepping motor to rotate said permanent magnet;

detect means comprising an interruptor plate having a large-diameter portion and a small-diameter portion, and rotating together with said permanent magnet; and a photo-interruptor disposed in opposition to said interruptor plate so that there is an interrupt state when said large-diameter portion is in opposition and a non-interrupt state when said small-diameter portion is in opposition, said photo-interruptor outputting signals of first and second levels for said interrupt and non-interrupt states, respectively; said detect means detecting, in accordance with the signals from said interruptor, a rotational position of said permanent magnet whereat one of said poles of said permanent magnet substantially opposes said disk; and control means which at the commencement of erase mode and recording mode operation, drive said stepping motor and then cause said stepping motor to stop, in response to signals from said photo-interruptor, thereby stopping said permanent magnet at a rotational position whereat one of said poles of said permanent magnet opposes said opto-magnetic disk, and at the end of the erase mode and recording mode operation, drive said stepping motor so as to rotate said permanent magnet by 90° from a position whereat said permanent magnet had been stopped.

2. A bias magnetic field impress apparatus as claimed in claim 1, wherein said control means comprises:

a CPU for controlling the entire operation of said opto-magnetic disk apparatus;

an interface for outputting erase or record request signals requesting whether an erase mode bias magnetic field or a record mode magnetic field is to be made in accordance with an instruction from said CPU;

a system controller for outputting predetermined number of pulse signals in accordance with said signals from said permanent magnet position detect means and said erase or record request signals from said interface; and a motor drive circuit for supplying said pulse signals from said system controller and driving said stepping motor.

3. A bias magnetic field impress apparatus including a permanent magnet for an opto-magnetic disk apparatus comprising:

said permanent magnet disposed along the same direction as the direction of movement of an optical head along a radial direction of an opto-magnetic disk, and provided so as to closely oppose a side of said opto-magnetic disk opposite a side opposed by said optical head, said permanent magnet rotatably movable around an axis of rotation extending in the same direction as the direction of movement of said optical head and having different magnetic poles at both ends with respect to said axis of rotation, and one of said magnetic poles opposing said opto-magnetic disk to impress a bias magnetic field on said opto-magnetic disk;

a stepping motor to rotate said permanent magnet;

detect means for detecting a rotational position of said permanent magnet whereat one of said poles of said permanent magnet substantially opposes said disk;

control means which, at the commencement of erase mode and recording mode operation, drive said stepping motor and then cause said stepping motor to stop, in response to signals from said photo-interruptor, thereby stopping said permanent magnet at a rotational position whereat one of said poles of said permanent magnet opposes said opto-magnetic disk, and at the end of the erase mode and recording mode operation, drive said stepping motor so as to rotate said permanent magnet by 90° from a position whereat said permanent magnet had been stopped, said detect means comprising:

an interruptor plate having a large-diameter portion for one half of its periphery and a small-diameter portion for a remaining half of its periphery, and rotating together with said permanent magnet; and a photo-interruptor disposed in opposition to said interruptor plate so that there is an interrupt state when said large-diameter portion is in opposition and a non-interrupt state when said small-diameter portion is in opposition, said photo-interruptor outputting signals of first and second levels for said interrupt and non-interrupt states, respectively, said permanent magnet, interruptor plate and photo-interruptor being disposed so that:

(i) at said rotational position deviated by a predetermined angle from a rotational position whereat one of the magnetic poles of said permanent magnet opposes said disk, the boundary between said large-diameter interruptor portion and said small-diameter non-interruptor portion of said interruptor plate opposes said photo-interruptor, (ii) at said position whereat one of the magnetic poles of said permanent magnet is at a rotational position whereat it opposes said disk, one of said large-diameter interruptor portion and said small-diameter non-interruptor portion opposes said photo-interruptor, and (iii) when one of said output signals of said photo-interruptor changes from said first level to said second level and when an output signal of said photo-interruptor changes from said second level to said first level, said permanent magnet has respective rotational positions which are 180° different from each other.

4. A bias magnetic field impress apparatus as claimed in claim 3, wherein said control means comprises:

a CPU for controlling the entire operation of said opto-magnetic disk apparatus, an interface for outputting erase or record request signals requesting whether an erase mode bias magnetic field or a record mode bias magnetic field is to be made, in accordance with an instruction from said CPU, a system controller for outputting a predetermined number of pulse signals in accordance with said signals from said permanent magnet position detect means and said erase or record request signals from said interface, and a motor drive circuit for supplying said pulse signals from said system controller and driving said stepping motor.

5. A bias magnetic field impress apparatus as claimed in claim 4, wherein said system controller outputs said pulse signals after power has been applied to said opto-magnetic disk apparatus, and even after there has been a change in level of output signals of said photo-interruptor, continuously outputs a predetermined number of pulse signals, said predetermined number being equivalent to the number of pulse signals required to rotate said permanent magnet by a predetermined deviated angle, said stepping motor being driven so that said permanent magnet is rotated to a reference rotational position where one of the magnetic poles of said permanent magnet opposes said disk.

6. A bias magnetic field impress apparatus including a permanent magnet for an opto-magnetic disk apparatus comprising:

said permanent magnet disposed along the same direction as the direction of movement of an optical head along a radial direction of an opto-magnetic disk, and provided so as to closely oppose a side of said opto-magnetic disk opposite a side opposed by said optical head, said permanent magnet rotatably movable around an axis of rotation extending in the same direction as the direction of movement of said optical head and having different magnetic poles at both ends with respect to said axis of rotation, and one of said magnetic poles opposing said opto-magnetic disk to impress a bias magnetic field on said opto-magnetic disk;

a stepping motor to rotate said permanent magnet;

detect means for detecting a rotational position of said permanent magnet whereat one of said poles of said permanent magnet substantially opposes said disk;

control means which at the commencement of erase mode and recording mode operation, drive said stepping motor and then cause said stepping motor to stop, in response to signals from said photo-interruptor, thereby stopping said permanent magnet at a rotational position whereat one of said poles of said permanent magnet opposes said opto-magnetic disk, and at the end of the erase mode and recording mode operation, drive said stepping motor so as to rotate said permanent magnet by 90° from a position whereat said permanent magnet had been stopped, wherein said control means comprises:

a CPU for controlling the entire operation of said opto-magnetic disk apparatus;

an interface for outputting erase or record request signals requesting whether an erase mode bias magnetic field or a record mode magnetic field is to be made in accordance with an instruction from said CPU;

a system controller for outputting predetermined number of pulse signals in accordance with said signals from said permanent magnet position detect means and said erase or record request signals from said interface; and a motor drive circuit for supplying said pulse signals from said system controller and driving said stepping motor.

* * * * *